Patented Jan. 23, 1940

2,188,284

UNITED STATES PATENT OFFICE 2,188,284

GOLF BALL COVER

James A. Merrill, Akron, Ohio, assignor to Wingfoot Corporation, Wilmington, Del., a corporation of Delaware No Drawing. Application September 23, 1936, Serial No. 102,219

7 Claims. (Cl. 273—62)

This invention relates to a tough plastic composition suitable for golf ball covers, etc. It includes the composition and a golf ball which has a cover of such composition.

The composition comprises a chloroprene polymer of the type marketed as "Duprene", and a condensation derivative of rubber. It may also include other resinous or gum-like materials. Preferably it includes a small amount of rubber. Coloring pigments are advantageously incorporated in the cover.

The condensation derivative of rubber which is employed may be made by treating rubber in solid form or in solution with a condensing agent such as a phenol or toluene sulphonic acid, hydrofluoric acid, chloro-stannic acid, or the halide of an amphoteric element such as tin tetrachloride, boron fluoride, etc. The condensation derivative of rubber is preferably prepared under non-oxidizing conditions. For example, a solution of the rubber may be treated with tin tetrachloride or chlorostannic acid. The resulting reacted cement may be poured into a large volume of water contain a small amount of a reducing agent such as sodium sulphite. The solvent is then volatilized by steam and the condensation derivative thus precipitated. The compound thus obtained is advantageously milled to solid form in order to prevent excessive oxidation. A harder or softer product is obtained by allowing the conversion agent to act on the rubber a longer or shorter time. A derivative with a softening point of about 45° C. was used in the following formula. When other resinous or gum-like materials are added, or the ingredients are employed in a different ratio from that given below, it may be desirable to use a somewhat harder or softer derivative.

In preparing the cover composition I may, for example, add the polymer to the condensation derivative slowly on a cold rubber mill. About equal parts of the polymer and condensation derivative may be employed. Rubber, balata, gutta percha or resinous materials may be added. According to a preferred formula 60 parts of the condensation derivative, 40 parts of the polymer known as "Duprene" and 20 parts of rubber are employed. For example, to 60 parts of the condensation derivative of rubber (prepared as above indicated by treating a rubber cement with chlorostannic acid), 40 parts of "Duprene" and 20 parts of pale crepe rubber were slowly added on a cold rubber mill. The "Duprene" was first milled into the condensation derivative and then the rubber was added. Before adding the "Duprene" 4 parts of light calcined magnesia, 8 parts titanium oxide and 2.4 parts of zinc oxide were milled into the condensation derivative. It is quite general practice to incorporate magnesia and zinc oxide in "Duprene". Titanium oxide was used for coloring.

The resulting composition is thermoplastic and may be applied to a golf ball center by any of the usual processes. For example, it may be formed into cups and these cups may then be molded onto the golf ball center with heat and pressure. The resulting golf ball may be painted or otherwise treated as desired. The ball may be surface treated with tin tetrachloride before painting.

I claim:

1. A tough, thermoplastic, homogeneous composition of a condensation derivative of rubber and a chloroprene polymer.

2. A tough, thermoplastic composition comprising a homogeneous mixture of about equal proportions of a condensation derivative of rubber and a chloroprene polymer.

3. A tough, thermoplastic composition comprising a homogeneous mixture of about 60 parts of a condensation derivative, 40 parts of a chloroprene type and 20 parts of rubber.

4. A golf ball with a molded cover comprising a homogeneous mixture of a chloroprene polymer and a condensation derivative of rubber.

5. A golf ball with a molded cover comprising a homogeneous mixture of a chloroprene polymer, rubber and a condensation derivative of rubber.

6. A golf ball with a molded cover comprising a homogeneous mixture of substantially equal proportions of a chloroprene polymer and a condensation derivative of rubber.

7. A golf ball with a molded cover comprising a homogeneous mixture of about 60 parts of a condensation derivative of rubber, about 40 parts of a chloroprene polymer type and about 20 parts of rubber.

JAMES A. MERRILL.

CERTIFICATE OF CORRECTION.

Patent No. 2,188,284. January 23, 1940.

JAMES A. MERRILL.

It is hereby certified that error appears in the printed specification of the above numbered patent requiring correction as follows: First column, line 24, for the word "contain" read containing; second column, line 33, claim 3, for "type" read polymer; line 47, claim 7, strike out "type"; and that the said Letters Patent should be read with this correction therein that the same may conform to the record of the case in the Patent Office.

Signed and sealed this 2nd day of April A. D. 1940.

(Seal)

Henry Van Arsdale,
Acting Commissioner of Patents.